United States Patent
Donderici

(10) Patent No.: US 12,233,887 B2
(45) Date of Patent: Feb. 25, 2025

(54) OPTIMIZATION OF DEEP LEARNING AND SIMULATION FOR AUTONOMOUS VEHICLES

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 347 days.

(21) Appl. No.: 17/829,027

(22) Filed: May 31, 2022

(65) Prior Publication Data

US 2023/0382407 A1    Nov. 30, 2023

(51) Int. Cl.
*B60W 60/00*    (2020.01)
*B60W 50/06*    (2006.01)
*G05B 13/02*    (2006.01)

(52) U.S. Cl.
CPC .......... *B60W 50/06* (2013.01); *B60W 60/001* (2020.02); *G05B 13/027* (2013.01)

(58) Field of Classification Search
None
See application file for complete search history.

(56) References Cited

U.S. PATENT DOCUMENTS

| | | | | |
|---|---|---|---|---|
| 11,774,250 | B2* | 10/2023 | Colgate | G06V 20/56 701/27 |
| 11,782,451 | B1* | 10/2023 | Venkatraman | G05D 1/0221 701/26 |
| 2023/0082365 | A1* | 3/2023 | Shiarlis | G05B 13/027 701/27 |
| 2023/0176573 | A1* | 6/2023 | Kumavat | G05D 1/0038 701/23 |
| 2023/0229916 | A1* | 7/2023 | Chechik | G06N 5/01 706/25 |
| 2023/0278582 | A1* | 9/2023 | Zhang | B60W 60/0011 701/25 |
| 2023/0316830 | A1* | 10/2023 | Herman | B60W 50/10 701/33.4 |
| 2023/0325670 | A1* | 10/2023 | Clemons | G06N 3/09 706/15 |

* cited by examiner

*Primary Examiner* — James M McPherson
(74) *Attorney, Agent, or Firm* — Michael DiCato

(57) ABSTRACT

An operation of an AV in a scene is simulated. The AV includes sensors detecting the scene and generating sensor data. The sensor data can be input into a control model that outputs control signals, in accordance with which the AV operates. A learning cost, i.e., a cost of training or applying the control model, is determined. A performance of the AV during the simulation is evaluated. A simulation cost, i.e., a cost of running the simulation is determined. The control model can be optimized based on the learning cost and the performance of the AV. Settings of the sensors can be optimized based on the simulation cost and the performance of the AV. The optimization of the control model or the settings of the sensors can be done through reinforcement learning.

20 Claims, 8 Drawing Sheets

100

OPTIMIZATION OF DEEP LEARNING AND SIMULATION FOR AUTONOMOUS VEHICLES

TECHNICAL FIELD OF THE DISCLOSURE

The present disclosure relates generally to autonomous vehicles (AVs) and, more specifically, to optimization of deep learning and simulation for AVs.

BACKGROUND

An AV is a vehicle that is capable of sensing and navigating its environment with little or no user input. An autonomous vehicle may sense its environment using sensing devices such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" includes both fully autonomous and semi-autonomous vehicles.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
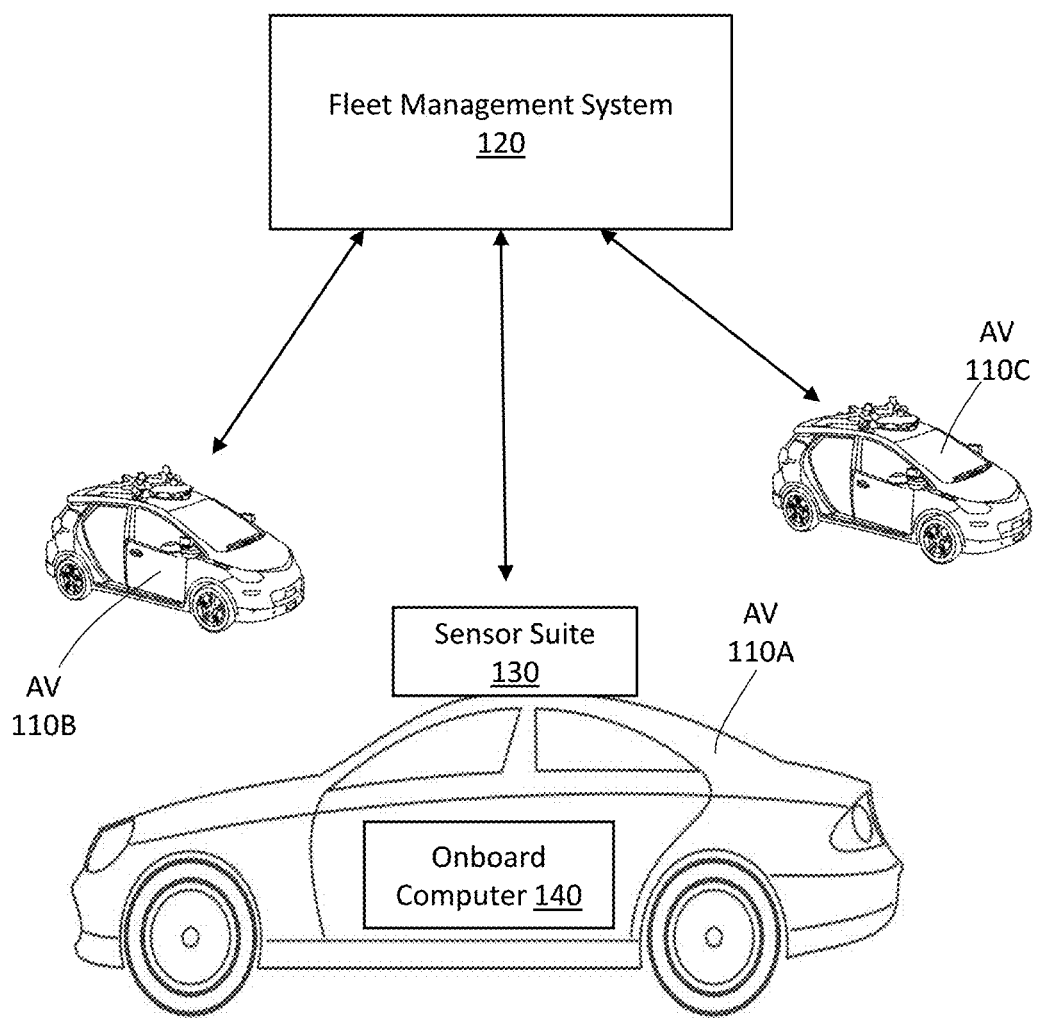
FIG. 1 illustrates a system including a fleet of AVs and a fleet management system, according to some embodiments of the present disclosure.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

AVs usually process streams of data from various sensors, such as cameras, LIDAR, RADAR, GPS, interior sensors, and so on. Deep learning models are used to process the data and control operational behaviors of AVs. Simulation is used to facilitate deep learning. For instance, data for training a deep learning model can be acquired through simulation. Also, simulation can be used to test the deep learning model, or to test other AV components, such as sensors. However, deep learning and simulation can consume a significant amount of resource (e.g., computation resource), which limits the development of AVs.

Embodiments of the present disclosure may improve on at least some of the challenges and issues described above by optimizing deep learning models and simulation for AVs. An operation of an AV in a scene can be simulated. The AV includes a sensor suite that detects the scene and generates sensor data. The sensor suite includes one or more sensors, each of which may have a setting, such as sensor fidelity. The sensor fidelities of the sensor suite indicate a quality (e.g., accuracy, resolution, etc.) in the sensor data. The operation of the AV is controlled by a control model. The control model can receive the sensor data as input and output control signals, in accordance with which the AV operates. The control model may be a deep neural network (DNN) trained through deep learning, such as end-to-end (E2E) learning.

A larger control model (e.g., a DNN with more layers) can make better decisions and enable better performance of the AV. However, it can cost more resources to train or apply a larger model. In some embodiments of the present disclosure, a control model can be modified to optimize both the cost for deep learning and the performance of the AV. A learning cost is determined by evaluating a cost for training the control model, applying the control model to control the AV, or both. A performance score is determined by evaluating a performance of the AV during the simulated operation. One or more parameters of the control model can be modified based on an optimization of an aggregation of the learning cost and the performance score. The optimization may be done through reinforcement learning. The one or more parameters may include an internal parameter of the control model, which is determined through training the control model and is used to generate the control signal. Alternatively or additionally, the one or more parameters may include a hyperparameter of the control model, which determines how the control model will be trained. The control model may be updated or re-trained based on the modified parameters.

The cost of the simulation can depend on settings of components of the AV. For instance, it consumes more resources to simulate an AV including sensors with higher fidelities can provide. However, the performance of the AV can be better. In some embodiments of the present disclosure, an optimal set of settings of AV components can be determined based on an optimization of both the simulation cost and the performance of the AV. The simulation cost, also referred to as testing cost, may be determined by evaluating an amount of resource consumed for running the simulation. One or more component settings can be modified based on an optimization of an aggregation of the simulation cost and the performance score. The optimization may be done through reinforcement learning. The AV can be updated based on the optimal set of component settings for further simulation. The optimal set may include mixed settings, such as a high fidelity for a sensor but a low fidelity for another sensor.

As will be appreciated by one skilled in the art, aspects of the present disclosure, in particular aspects of AV sensor calibration, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

The systems, methods and devices of this disclosure each have several innovative aspects, no single one of which is solely responsible for all of the desirable attributes disclosed herein. Details of one or more implementations of the subject matter described in this Specification are set forth in the description below and the accompanying drawings.

Example AV Environment

FIG. 1 illustrates a system 100 including a fleet of AVs 110A-C (collectively referred to as "AV 110" or "AVs 110") and a fleet management system 120, according to some embodiments of the present disclosure. For purpose of simplicity and illustration, in FIG. 1, the AV 110A includes a sensor suite 130 and an onboard computer 140. The AV 110B or 110C may also include a sensor suite 130 and an onboard computer 140. In other embodiments, the system 100 may include fewer, more, or different components. For instance, the system 100 may include a different number of AVs 110 or a different number of fleet management systems 120.

The AV 110 may be a fully autonomous automobile, but may additionally or alternatively be any semi-autonomous or fully autonomous vehicle; e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. In some embodiments, some or all of the vehicle fleet managed by the fleet management system 120 are non-autonomous vehicles dispatched by the fleet management system 120, and the vehicles are driven by human drivers according to instructions provided by the fleet management system 120.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The sensor suite 130 includes one or more sensors that can detect an environment surrounding the AV 110, such as a scene in which the AV 110 navigates. The sensor suite 130 can detect objects in the environment. The sensor suite 130 may include a computer vision ("CV") system, localization sensors, and driving sensors. For example, the sensor suite 130 may include interior and exterior cameras, RADAR sensors, sonar sensors, LIDAR sensors, thermal sensors, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110. For example, the AV 110 may have multiple cameras located at different positions around the exterior and/or interior of the AV 110. More information regarding the sensor suite 130 is provided below in conjunction with FIG. 2.

The onboard computer 140 is connected to the sensor suite 130 and functions to control the AV 110 and to process sensed data from the sensor suite 130 and/or other sensors in order to determine the state of the AV 110. Based upon the vehicle state and programmed instructions, the onboard computer 140 modifies or controls behavior of the AV 110. The onboard computer 140 is preferably a general-purpose computer adapted for I/O communication with vehicle control systems and sensor suite 130, but may additionally or alternatively be any suitable computing device. The onboard computer 140 is preferably connected to the Internet via a wireless connection (e.g., via a cellular data connection). Additionally or alternatively, the onboard computer 140 may be coupled to any number of wireless or wired communication systems.

In some embodiments, the onboard computer 140 uses a trained model to control the AV 110. Such a model is also referred to as a "control model" or "AV control model." A control model may be a DNN. The onboard computer 140 may use the control model for perception (e.g., identification of objects, etc.), prediction (e.g., prediction of traffic condition, etc.), planning, localization, navigation, or other types of operations of the AV. In some embodiments, the onboard computer 140 may provide sensor data (and/or data generated based on the sensor data) into the model. The model outputs one or more control signals based on which the AV 110 operates. For instance, the control signals specify how the AV 110 drives, reacts to other objects surrounding the AV 110, and so on. In some embodiments, the onboard computer 140 receives the model from the fleet management system 120. In other embodiments, the onboard computer 140 trains a part or the whole model. More information regarding the onboard computer 140 is provided below in conjunction with FIG. 5.

The fleet management system 120 manages the fleet of AVs 110. The fleet management system 120 may manage one or more services that provides or uses the AVs, e.g., ride service, delivery service, or other types of services. The fleet management system 120 selects one or more AVs (e.g., AV 110A) from a fleet of AVs 110 to perform a particular service or other task, and instructs the selected AV to provide the service. The fleet management system 120 may also send the selected AV information that the selected AV may use to complete the service. The fleet management system 120 also manages fleet maintenance tasks, such as fueling, inspecting, calibrating, and servicing of the AVs. As shown in FIG. 1, the AVs 110 communicate with the fleet management system 120. The AVs 110 and fleet management system 120 may connect over a public network, such as the Internet.

The fleet management system 120 may also train AV control models and distribute the control models to the fleet of AVs 110. The fleet management system 120 can train a control model through deep learning, such as E2E learning. The fleet management system 120 can also run simulations to generate data for training control models or to test trained control models. In an example, the fleet management system 120 generates a virtual AV representing an AV 110 and a virtual scene including virtual objects. One or more sensors in the virtual AV can capture sensor data in the virtual scene. The sensor data can be provided to a control model, which controls behaviors of the virtual AV in the virtual scene. The fleet management system 120 may generate, from the simulation, testing data that indicates the behaviors of the virtual AV and may further use the testing data to evaluate the performance of the virtual AV. In some embodiments, the fleet management system 120 may generate a virtual AV that simulates the AV 110. The fleet management system 120 may modify the control model to optimize the cost of training or using the control model and the performance of the virtual AV. The fleet management system 120 may also modify the virtual AV to optimize the cost of the simulation and the performance of the virtual AV. More information regarding onboard computer is provided below in conjunction with FIG. 3.

Example Sensor Suite

Figure 2:
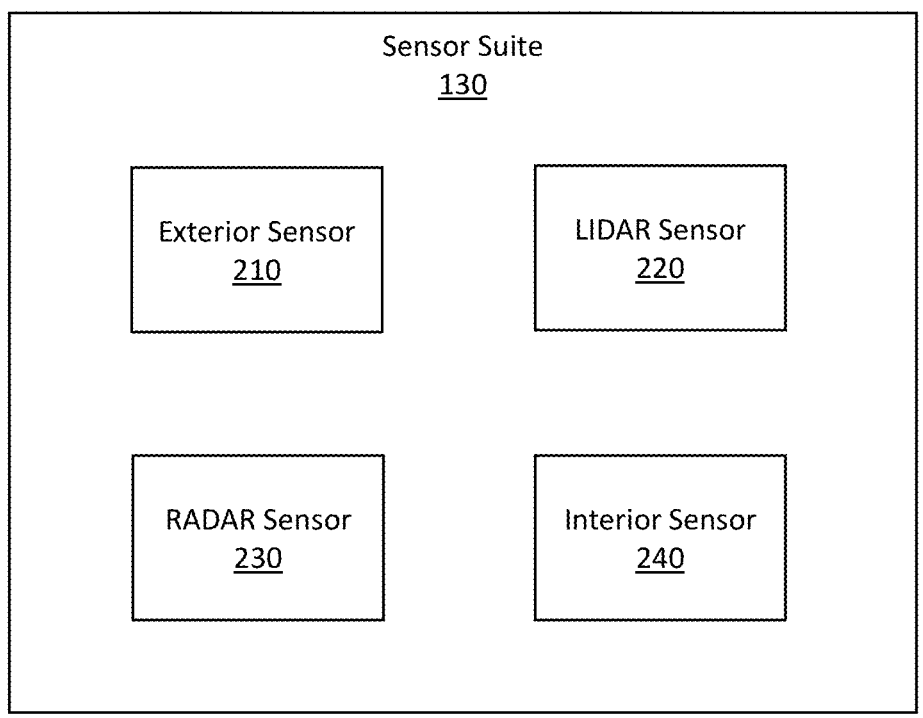
FIG. 2 is a block diagram showing a sensor suite, according to some embodiments of the present disclosure.

FIG. 2 is a block diagram showing the sensor suite 130, according to some embodiments of the present disclosure. The sensor suite 130 includes an exterior sensor 210, a LIDAR sensor 220, a RADAR sensor 230, an interior sensor 240, and a user input sensor 250. The sensor suite 130 may include any number of the types of sensors shown in FIG. 2, e.g., one or more exterior sensor 210, one or more LIDAR sensors 220, etc. The sensor suite 130 may have more types of sensors than those shown in FIG. 2, such as the sensors described with respect to FIG. 1. In other embodiments, the sensor suite 130 may not include one or more of the sensors shown in FIG. 2.

The exterior sensor 210 detects objects in an environment around the AV 110. The environment may include a scene in which the AV 110 navigates. Example objects include persons, buildings, traffic lights, traffic signs, vehicles, street signs, trees, plants, animals, or other types of objects that may be present in the environment around the AV 110. In some embodiments, the exterior sensor 210 includes exterior cameras having different views, e.g., a front-facing camera, a back-facing camera, and side-facing cameras. One or more exterior sensor 210 may be implemented using a high-resolution imager with a fixed mounting and field of view. One or more exterior sensors 210 may have adjustable field of views and/or adjustable zooms. In some embodiments, the exterior sensor 210 may operate continually during operation of the AV 110. In an example embodiment, the exterior sensor 210 captures sensor data (e.g., images, etc.) of a scene in which the AV 110 navigates.

The LIDAR sensor 220 measures distances to objects in the vicinity of the AV 110 using reflected laser light. The LIDAR sensor 220 may be a scanning LIDAR that provides a point cloud of the region scanned. The LIDAR sensor 220 may have a fixed field of view or a dynamically configurable field of view. The LIDAR sensor 220 may produce a point cloud that describes, among other things, distances to various objects in the environment of the AV 110.

The RADAR sensor 230 can measure ranges and speeds of objects in the vicinity of the AV 110 using reflected radio waves. The RADAR sensor 230 may be implemented using a scanning RADAR with a fixed field of view or a dynamically configurable field of view. The RADAR sensor 230 may include one or more articulating RADAR sensors, long-range RADAR sensors, short-range RADAR sensors, or some combination thereof.

The interior sensor 240 detects the interior of the AV 110, such as objects inside the AV 110. Example objects inside the AV 110 include passengers, components of the AV 110, items delivered by the AV 110, items facilitating services provided by the AV 110, and so on. The interior sensor 240 may include multiple interior cameras to capture different views, e.g., to capture views of an interior feature, or portions of an interior feature. The interior sensor 240 may be implemented with a fixed mounting and fixed field of view, or the interior sensor 240 may have adjustable field of views and/or adjustable zooms, e.g., to focus on one or more interior features of the AV 110. The interior sensor 240 may operate continually during operation of the AV 110. The interior sensor 240 may transmit sensor data to a perception module (such as the perception module 530 described below in conjunction with FIG. 5), which can use the sensor data to classify a feature and/or to determine a status of a feature.

Example Fleet Management System

Figure 3:
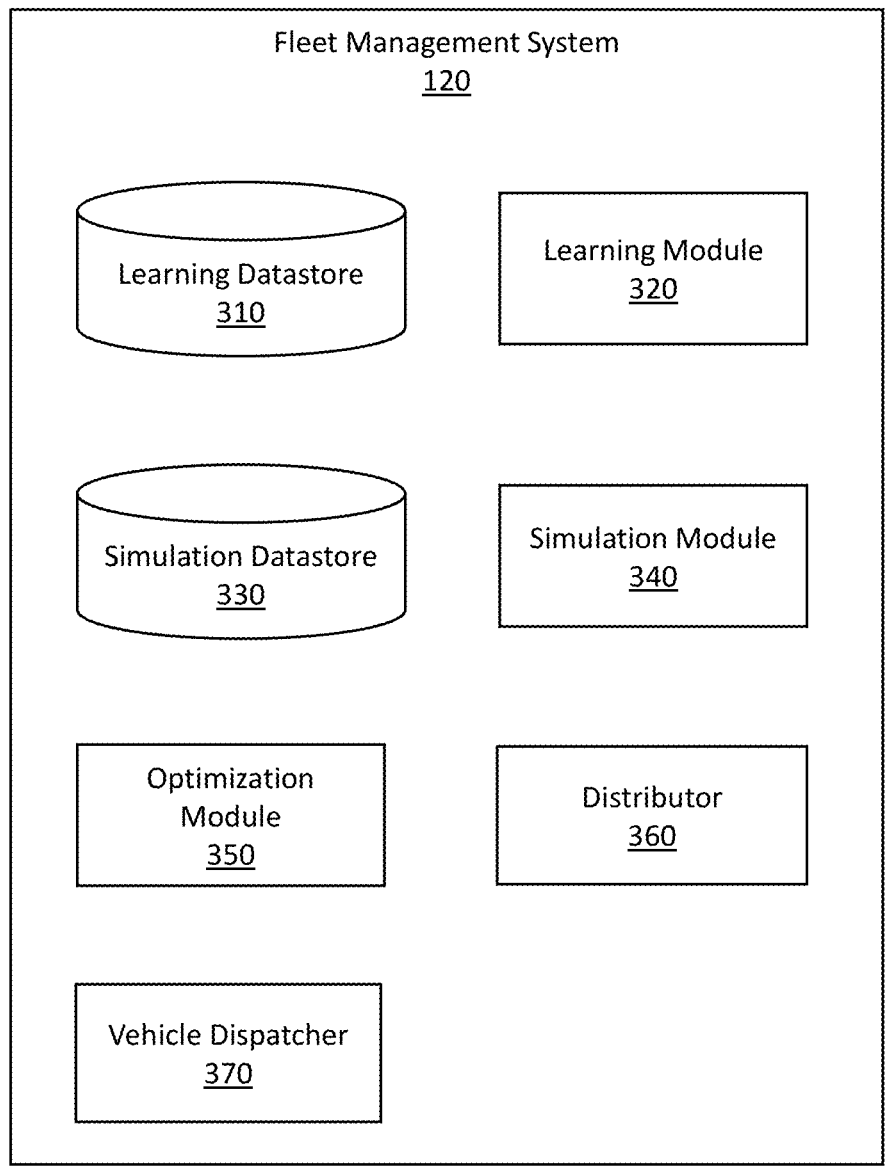
FIG. 3 is a block diagram showing a fleet management system, according to some embodiments of the present disclosure.

FIG. 3 is a block diagram showing the fleet management system 120, according to some embodiments of the present disclosure. As shown in FIG. 3, the fleet management system 120 includes a learning datastore 310, a learning module 320, a simulation datastore 330, a simulation module 340, an optimization module 350, a distributor 360, and a vehicle dispatcher 370. In alternative configurations, different and/or additional components may be included in the fleet management system 120. Further, functionality attributed to one component of the fleet management system 120 may be accomplished by a different component included in the fleet management system 120 or a different system than those illustrated. For instance, some or all of the functions of one or more components of the fleet management system 120 may be performed by the onboard computer 140.

The learning datastore 310 stores data associated with AV control models. For instance, the learning datastore 310 may also store training data sets, validation data sets, hyperparameters used to train control models, hyperparameters used to compress control models, internal parameters (e.g., weights of filters) of control models, or other data associated with AV control models. In some embodiments, the learning datastore 310 stores environmental sensor data collected by the AVs 110. Some of the learning datastore 310 may be gathered by a fleet of AVs. For example, images obtained by exterior cameras of the AVs may be used to learn information about the AVs' environments. The sensor data may be processed to identify particular objects in the environment. The fleet management system 120 and/or AVs 110 may have one or more perception modules (e.g., the perception module 530 described below in conjunction with FIG. 5) to identify objects in the sensor data. Information of these objects may be stored in the learning datastore 310.

In some embodiments, the learning datastore 310 includes data describing roadways, such as locations of roadways, connections between roadways, roadway names, speed limits, traffic flow regulations, toll information, etc. The learning datastore 310 may further include data describing buildings (e.g., locations of buildings, building geometry, building types, etc.) that may be present in the environments of an AV 110. The learning datastore 310 may also include data describing other objects, such as bike lanes, sidewalks, crosswalks, traffic lights, parking lots, signs, billboards, trees, animals, plants, etc.

In some embodiments, certain sensor data (e.g., sensor data indicating objects that are expected to be temporary) may expire after a certain period of time. In some embodiments, data captured by an AV (e.g., a different AV) may indicate that a previously-observed object is no longer present (e.g., a traffic cone has been removed) and in response, the fleet management system 120 may remove the corresponding sensor data from the learning datastore 310. In some embodiments, the learning datastore 310 stores map data for a city or region in which the AV 110 is located. The learning datastore 310 may store a detailed map of environments through which the fleet of AVs 110 may travel.

The learning module 320 trains AV control models. An AV control model generates outputs which can be used to control some or all operation of an AV, such as perception (e.g., classification of objects, etc.), prediction (e.g., prediction of traffic condition, etc.), planning, localization, navigation, or other types of operation of the AV. An AV control model may be a DNN, and the learning module 320 can train the DNN through deep learning, such as end-to-end (E2E) learning. The DNN may include a plurality of layers, such as layers that constitute an acyclic computation graph, where each layer may be a node of the graph, and signals can be passed through the nodes of the graph. The layers may comprise convolutional layers, activation function layers, pooling layers, fully connected layers, normalization layers, softmax or logistic layers, and so on. In some embodiments, different layers of the DNN solves different tasks. For example, a first layer extract features from sensor data from an AV; a second layer that outputs different control signals. For instance, a first layer of the DNN outputs a perception, a second layer generates a model (e.g., a world model) of an environment surrounding the AV based on the features extracted by the first layer; a third layer determines behaviors of the AV based on the model generated by the second layer; a fourth layer provides planning of the maneuvers of the AV to satisfy the behaviors determined by the third layer; and a fifth layer generates control signals that will be sent to components of the AV, which will perform the maneuvers in accordance with the control signals. In some embodiments, the learning module 320 trains AV control models based on instructions from the optimization module 350, which is described below.

In some embodiments, the learning module 320 uses a training data set to train an AV control model. The learning module 320 may form a training data set that includes training samples and ground-truth labels of the training samples. The training samples may include real or simulated sensor data or objects identified based on the real or simulated sensor data. Real sensor data is sensor data captured by an AV 110, e.g., in a real-world scene where the AV 110 operations. Simulated sensor data is sensor data generated through a simulation of an operation of an AV in a scene. The simulation may include a virtual representation of an AV operating in a virtual scene. The ground-truth labels may include, for example, operations of AVs that are considered appropriate, such as operations that are considered safe, operations that can make passengers feel comfortable, etc. The ground-truth labels may also include labels indicating evaluations of operations of AVs, such as safety score, comfortable scores, or other types of evaluations. The ground-truth labels may also include common occurrences of road evens. A ground-truth label may be an edge case that is statistically rare but significant to the safety or comfort of AV. In some embodiments, a part of the training data set may be used to initially train the AV control model, and the rest of the training data set may be held back as a validation subset used by the learning module 320 to validate performance of the trained AV control model. The portion of the training data set not including the validation subset may be used to train the AV control model. The learning module 320 can input the training data set into the neural network and modify parameters inside the network (i.e., internal parameters, such as weights of filters of convolutional layers) to minimize the error between labels generated by the network based on the training samples and the ground-truth labels. In some embodiments, the learning module 320 uses a cost function to minimize the error.

After an AV control model is trained, the learning module 320 may also compress the AV control model, e.g., given limited computation resources available in an AV. In some embodiments, the learning module 320 may compress the AV control model through knowledge distillation. The learning module 320 can use the trained control model as a "teacher model" to train a "student model" that has a smaller size (e.g., less layers) than the teacher model. The student model can be deployed to an AV, e.g., by the distributor 360, and used to control operation of the AV. Both the teacher model and student model may be DNNs. In some embodiment, the teacher model is trained separately from the student model. The teacher model may be trained first by using a separate data set.

The learning module 320 may use the teacher model to teach the student model what to do. In some embodiments, the learning module 320 provides a training data set to both the teach model and the student model. Layers (e.g., convolution layers) of the teacher model outputs feature maps. The learning module 320 trains the student model to learn the behavior of the teacher model by trying to replicate these output feature maps, which are referred to as "distilled knowledge." In an example, the learning module 320 may establish correspondence between the student model and the pre-trained teacher model. The correspondence may include passing an output of a layer in the teacher model to the student model. Data augmentation may be performed before passing the output to the student model. In an embodiment, the data may be passed through the teacher model to get intermediate outputs (e.g., outputs of some or all of the layers of the teacher model), then data augmentation is applied to the intermediate outputs. Further, the outputs from the teacher model and the correspondence relation are used to backpropagate error in the student model, and the student model can learn to replicate the behavior of the teacher network. The learning module 320 may also provide the ground-truth labels to the student model and trains the student model further based on the ground-truth labels, e.g., by minimizing the error between the labels generated by the student model and the ground-truth labels, The learning module 320 may use the teacher model to train multiple student models, or use multiple teacher models to train a student model.

The learning module 320 may also use other compression approaches to compress a control model, e.g., for the purpose of reducing the amount of computation. The other compression approaches may include filter pruning, quantization, and so on. In some embodiments, the learning module 320 also determines hyperparameters for training or compressing a DNN. Hyperparameters may be variables that determine how the network is trained and not part of the network. Hyperparameters are different from the internal parameters of the DNN. Examples of the hyperparameter include quantization bit-width, channel width, filter size, number of epochs, batch size, pooling size, number of hidden layers, choice of cost function, choice of activation function, learning rate, and so on. The learning module 320 can design the architecture of the DNN, e.g., based on some of the hyperparameters. The architecture of the network may include an input layer, an output layer, and a plurality of hidden layers. In embodiments where knowledge distillation is used, the learning module 320 can determine hyperparameters for both the teach model and the student model and can design the architecture of both the two models.

The simulator datastore 330 stores data associated with simulations run by the simulation module 340. For instance, the simulator datastore 330 stores simulated scenes generated by the simulation module 340 and information used by the simulation module 340 to generate the simulated scenes. As another example, the simulator datastore 330 stores data collected from simulations run by the simulation module 340, such data to be used for training AV control models, data to be used to evaluate AV performances, and so on.

The simulation module 340 runs simulations of operations of AVs. The simulations can be used to collect data for training AV control models. Additionally or alternatively, the simulations can be used to test AV control models or other components of AVs. Running the simulations can avoid the disadvantages of running AVs in real-world, such as high cost, safety concern, lack of control of environment, requirement for licenses, capabilities of AVs, and so on. In some embodiments, the simulation module 340 runs simulations based on instructions from the optimization module 350, which is described below.

The simulation module 340 can generate simulated scenes. A simulated scene may include a plurality of virtual objects, e.g., artificially generated objects. In some embodiments, the simulation module 340 generates a simulated scene based on a real-world scene and generate virtual objects that simulate real-world objects in the real-world scene. The simulated scene can be a virtual representation of the real-world scene. A virtual object may be a two-dimensional or three-dimensional graphic representation of the corresponding real-world object. The real-world objects may be captured by an AV (or multiple AVs) operating in the real-world scene. The simulation module 340 may identify the real-world objects based on sensor data from the sensor suite of the AV or perception data from a perception module of the AV.

In addition to the virtual objects that simulate real-world objects, the simulation module 340 may add other virtual objects into the simulated scene to facilitate collection of training data or testing data. The additional virtual objects may represent a class of objects that is not present or is underrepresented in the real-world scene. The simulation module 340 may label the virtual objects in the simulated scene. For instance, the simulation module 340 may generate a label for each virtual object based on the known category of the virtual object. The label may describe the category of the virtual object. The label may be used to train control models or to evaluate a performance of an AV, e.g., to determine an accuracy in perceptions of the AV.

In some embodiments, the simulation module 340 may generate a simulated scene by modifying a pre-generated simulated scene. In an embodiment, the pre-generated simulated scene was generated based on a first real-world scene, the simulation module 340 can modify the pre-generated simulated scene based on one or more differences between the first real-world scene and a second real-world scene, so that the modified simulated scene can represent the second real-world scene. In another embodiment, the simulation module 340 modify the pre-generated simulated scene to improve the simulation. For instance, the simulation module 340 may modify the pre-generated simulated scene based on an instruction from the optimization module to optimize the balance between simulation cost and AV performance.

The simulation module 340 may also generate a simulated AV, which is a virtual AV that simulates an AV 110. The simulation module 340 may enable the simulated AV to operate in the simulated scene and collect data from the operation of the simulated AV. The simulated AV may include a simulated onboard sensor suite that simulates the onboard sensor suite of the AV 110. The virtual onboard sensor suite can detect virtual objects in the surrounding environment of the simulated AV. For instance, the simulated onboard sensor suites may generate simulated sensor data of the virtual objects, e.g., images, audio, depth information, location information, and so on. In some embodiments, the simulation module 340 determines a fidelity for a sensor in the virtual onboard sensor suite. The fidelity of a sensor indicates a quality of the sensor, such as accuracy, precision, amount of noise, resolution, etc. An accuracy of the sensor may be a difference between an actual value and a value captured by the sensor. For a sensor with a higher fidelity, the sensor is more accurate, and the difference between the actual value and the captured value is less. The simulation module 340 may select a fidelity for a sensor from pre-determined fidelity options. In an example, the simulation module 340 may select from a list including a high fidelity, medium fidelity, and low fidelity. In another example, the pre-determined fidelity options may have a continuous scale. The simulation module 340 may select different fidelities for different sensors and the virtual onboard sensor suite may have mixed fidelities. In some embodiments, the simulation module 340 receives sensor fidelities from the optimization module 350.

The optimization module 350 optimizes deep learning done by the learning module 320. The optimization module 350 may optimize a deep learning process for training a control model based on a learning cost and a performance of an AV controlled by the control model. The learning cost is a cost associated with the control model, which includes a cost to train the control model, a cost to use the control model to control the AV, or both. The optimization module 350 may evaluate the performance of the AV based on data from the simulation module 340, which simulates an operation of the AV in a scene and controls the operation of the AV by using the control model.

The optimization module 350 may modify a parameter associated with the control model based on the learning cost and the evaluated performance of the AV. The parameter may be a hyperparameter or an internal parameter of the control model. A hyperparameter or internal parameter of the control model may comprise learning rate, learning schedule, number of layers, number of architectural blocks in the DNN, types of layers in the DNN, etc. In embodiments where the optimization module 350 modifies an internal parameter, the optimization module 350 may update (or instruct the learning module 320 to update) the control model with the modified internal parameter. In embodiments where the optimization module 350 modifies a hyperparameter, the optimization module 350 may instruct the learning module 320 to retrain the control model based on the modified hyperparameter. In some embodiments, the optimization module 350 modifies the parameter through reinforcement learning. In other embodiments, the optimization module 350 modifies the parameter by optimizing an aggregation of a learning score indicating the learning cost and a performance score indicating the performance of the AV. The aggregation may be a weighted sum. In an example, the learning cost may be a negative value, and the performance score is a positive value.

The optimization module 350 also optimizes simulations run by the simulation module 340. In some embodiments, the optimization module 350 optimize fidelities of a simulated sensor suite of a simulated AV based on a simulation cost and a performance of the simulated AV in a simulation. The simulation includes an operation of the simulated AV in a virtual scene. The simulation cost is a cost associated with the simulation, which includes a cost to generate the simulated AV, a cost to process sensor data captured by the simulated AV, or other costs associated with the simulation. In some embodiments, the optimization module 350 determines the simulation cost by measuring resources consumed by the simulation. The optimization module 350 may also evaluate the performance of the simulated AV during the simulation.

The optimization module 350 may modify the simulation based on the simulation cost and the performance of the simulated AV. For instance, the optimization module 350 modifies one or more sensor fidelities of the simulated AV. Decreasing a sensor fidelity may reduce simulation cost by enhance the performance of the simulated AV. Similarly, increasing a sensor fidelity may increase simulation cost by weaken the performance of the simulated AV. In some embodiments, the optimization module 350 optimizes the simulation through reinforcement learning. In other embodiments, the optimization module 350 optimizes an aggregation (e.g., a weighted sum) of a simulation score indicating the simulation cost and a performance score indicating the performance of the AV. In an example, the simulation cost may be a negative value, and the performance score is a positive value. More details regarding the optimization module 350 are provided below in conjunction with FIG. 4.

The distributor 360 distributes AV control models generated by the learning module 320 to AVs 110. In some embodiments, the distributor 360 receives a request for an AV control model from an AV. The request may include information of the onboard computer 150 in the AV 110, such as information describing available computing resource on the AV 110. The information describing available computing resource on the AV 110 can be information indicating network bandwidth, information indicating available memory size, information indicating processing power of the AV 110, and so on. In an embodiment, the distributor 360 may instruct the learning module 320 to generate (e.g., train or compress) an AV control model in accordance with the request. In another embodiment, the distributor 360 may select an AV control model from a group of pre-trained AV control models based on the request. The distributor 360 then transmits the AV control model to the AV 110.

The vehicle dispatcher 370 assigns the AVs 110 to various tasks (e.g., service tasks) and directs the movements of the AVs 110 in the fleet. In some embodiments, the vehicle dispatcher 370 includes additional functionalities not specifically shown in FIG. 3. For example, the vehicle dispatcher 370 instructs AVs 110 to drive to other locations while not servicing a user, e.g., to improve geographic distribution of the fleet, to anticipate demand at particular locations, etc. The vehicle dispatcher 370 may also instruct AVs 110 to return to an AV facility for fueling, inspection, maintenance, or storage. The vehicle dispatcher 370 may perform some or all of the functions of the onboard computer 140 that are described above in conjunction with FIGS. 1 and 5.

In some embodiments, the vehicle dispatcher 370 selects AVs from the fleet to perform various tasks and instructs the AVs to perform the tasks. In some embodiments, the vehicle dispatcher 370 selects an AV 110 based on availability of the AV 110. For example, the vehicle dispatcher 370 may determine that the AV 110 is available based on a determination that the AV 110 the AV 110 is not performing any task or is going to perform any task that has been assigned to the AV 110. In cases where a service request specifies a time window, the vehicle dispatcher 370 may determine that the AV 110 is available in the time window. In some embodiments (e.g., embodiments where multiple AVs 110 in the AV fleet are available), the vehicle dispatcher 370 may select one of the available AVs based on other factors, such as physical proximity.

The vehicle dispatcher 370 or another system may maintain or access data describing each of the AVs in the fleet of AVs 110, including current location, service status (e.g., whether the AV is available or performing a service; when the AV is expected to become available; whether the AV is schedule for future service), fuel or battery level, etc. The vehicle dispatcher 370 may select AVs for service in a manner that optimizes one or more additional factors, including fleet distribution, fleet utilization, and energy consumption. The vehicle dispatcher 370 may interface with one or more predictive algorithms that project future service requests and/or vehicle use, and select vehicles for services based on the projections.

Example Optimization Module

Figure 4:
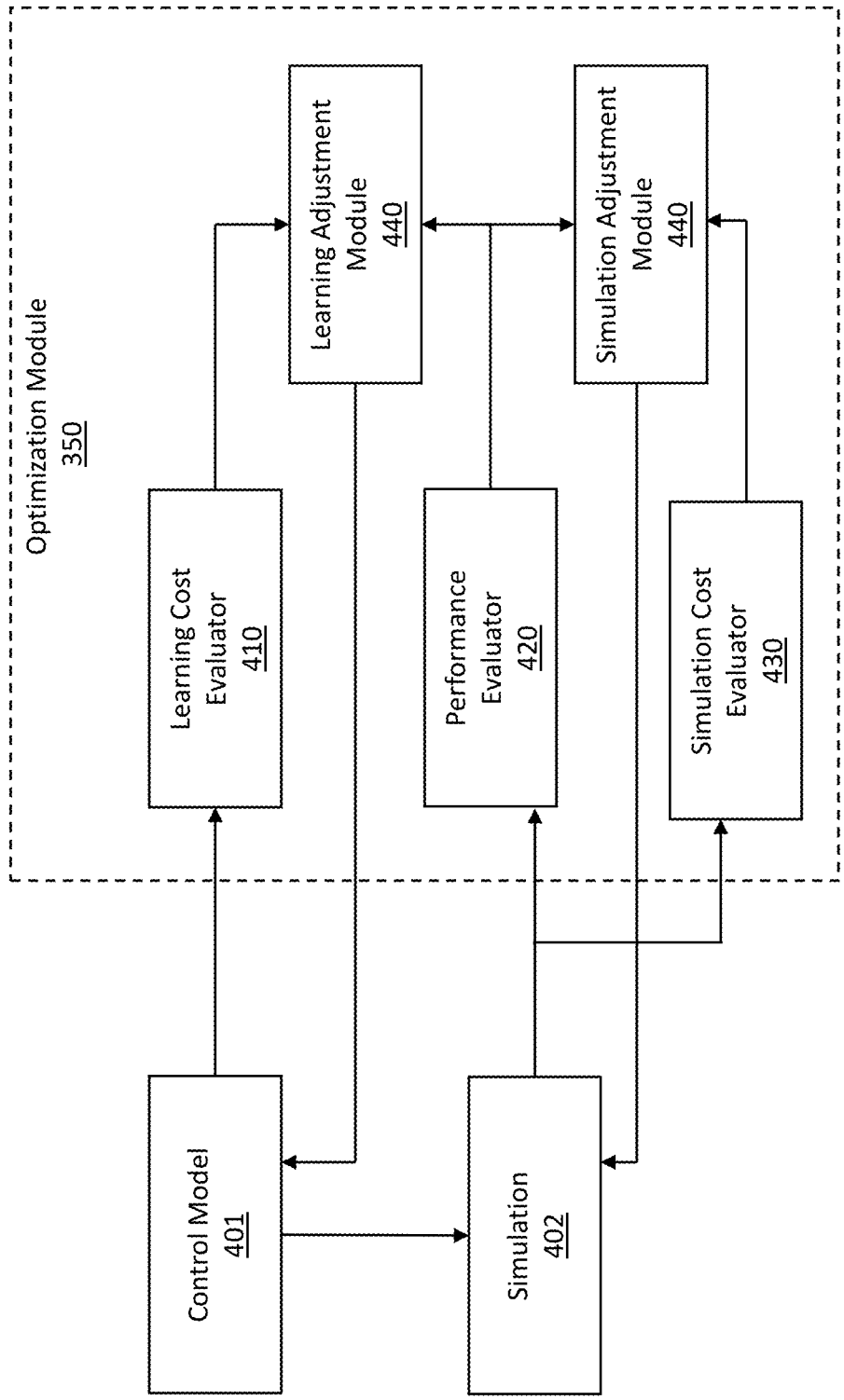
FIG. 4 illustrations example optimization processes by an optimization module, according to some embodiments of the present disclosure.

FIG. 4 illustrations example optimization processes by the optimization module 350, according to some embodiments of the present disclosure. In the embodiments of FIG. 4, the optimization module 350 optimizes a control model 401 and a simulation 402. The simulation 402 is a simulated operation of an AV controlled by the control model 401. The control model 401 may be generated by the learning module 320. The simulation 402 may be executed by the simulation module 340. The optimization module 350 includes a learning cost evaluator 410, a performance evaluator 420, a simulation cost evaluator 430, a learning adjustment module 440, and a simulation adjustment module 450. In alternative configurations, fewer, different and/or additional components may be included in the optimization module 350. Also, functionality attributed to one component of the optimization module 350 may be accomplished by a different component included in the onboard computer 140 or a different system from those illustrated.

The learning cost evaluator 410 determines a learning score that indicates a cost associated with the control model 401. The learning cost evaluator 410 may determine the learning score by aggregating a training cost and an application cost for the control model 401. The learning score may be a sum or weight sum of the training cost and application cost. In embodiments where the learning score is a weight sum of the training cost and application cost, the learning cost evaluator 410 may determine a training weight for the training score and an application weight for the application score. The learning cost evaluator 410 may determine the training weight or application weight based on resources available for training or applying the control model 401. The resources may include, for example, computational resource (e.g., processors, memory, data transfer bandwidth, etc.), energy resource (e.g., consumed electrical power), temporal resource, or other types of resources.

The training cost indicates a cost for training the control model 401. In some embodiments, the learning cost evaluator 410 may determine the training cost by measuring resources consumed by training the control model 401. The learning cost evaluator 410 may determine individual scores measuring different types of resources and aggregate the individual scores. In an example, the training cost may be a sum or weighted sum of the three individual scores that respectively correspond to computation resource, energy resource, and temporal resource. The learning cost evaluator 410 may determine a first individual score indicating an amount of computation resource consumed or required for training the control model 401. The amount of computation resource may be determined based on the number of processor(s) used for the training, teraflop(s) of processor(s) used for the training, the size of memory(ies) used for the training, data transfer bandwidth used for the training, availability of computational resource (e.g., scarcity, etc.), monetary cost associated with computation resource, other factors indicating the amount of computation resource, or some combination thereof. The learning cost evaluator 410 may also determine a second individual score indicating an amount of energy resource consumed or required for the training. The amount of energy resource may be determined based on the amount of electrical power (e.g., power for running devices, power for cooling down devices, etc.) used for the training. The learning cost evaluator 410 may also determine a third individual score indicating an amount of temporal resource consumed or required for the training. The amount of temporal resource may be determined based on the amount of time used for the training.

In other embodiments, the learning cost evaluator 410 may determine the training cost based on one or more hyperparameters used to train the control model 401, such as hyperparameters that can indicate resources required to train the control model 401. Examples of such hyperparameters include number of layers, size of training data set, number of epochs, and so on. The learning cost evaluator 410 may input the one or more hyperparameters into a trained model, and the trained model outputs the training cost.

The application cost indicates a cost for applying the control model 401 to control the simulation 402 and/or the actual operation of the AV. In some embodiments, the learning cost evaluator 410 may determine the applying cost by measuring resources consumed by applying the control model 401. The learning cost evaluator 410 may determine individual scores measuring different types of resources and aggregate the individual scores. In other embodiments, the learning cost evaluator 410 may determine the applying cost based on one or more parameters of the control model 401, such as internal parameters or hyperparameters that can indicate resources required to train the control model 401. Examples of such parameters include filter size, bid-width, number of layers, and so on. The learning cost evaluator 410 may input the one or more parameters into a trained model, and the trained model outputs the applying cost.

The performance evaluator 420 determines a performance score based on the simulation 402. The performance score indicates an evaluation of a performance of the AV during the simulation 402. The evaluation of the performance of the AV may include an evaluation of one or more operational behaviors of the AV, a number of non-recoverable errors of the AV, and so on. In some embodiments, the performance evaluator 420 measures the performance score based on one or more operational behaviors of the AV, such as perceptions, predictions, plans, control inputs, interactions with other objects (e.g., people, other vehicles, etc.), other factors indicating the performance of the AV, or some combination thereof.

In other embodiments, the performance score may be an aggregation of a comfort score and a safety score. The comfort score indicates an evaluation of passenger comfort during the simulation 402 of the AV. The safety score indicates an evaluation of operational safety of the AV during the simulation 402. The performance may be a sum or weighted sum of the comfort score and safety score. The performance evaluator 420 may determine a comfort weight for the comfort score and a safety weight based on the safety score. In some embodiments, the performance evaluator 420 determines the comfort weight and safety weight based on the simulation 402 (such as the type of service provided by the AV in the simulation 402), the type of scene used in the simulation 402, other factors, or some combination thereof. In an example, the safety weight is higher than the comfort score for a simulation of the AV providing a delivery service, versus the safety weight can be the same or similar as the comfort score for a simulation of the AV providing a ride service. In another example, the comfort weight may be higher for a simulation in a scene with low traffic, versus the safety weight may be higher for a simulation in a scene with high traffic.

The simulation cost evaluator 430 receives information of the simulation 402 and determines a simulation score that indicates a cost for running the simulation 402, e.g., as it relates to the fidelities of sensors and simulation assets. The simulation cost evaluator 430 may determine the simulation score based on settings of components of the AV, such as fidelities of sensors. It can cost more resources to run a simulation with sensors having higher fidelities. In some embodiments, the simulation cost evaluator 430 identifies a list of components of the AV, determines an individual cost for each component based on the setting of the component, and aggregates the individual costs to generate the simulation score. The individual cost of a component may be determined based on an amount of resources consumed or required for running the component, acquiring the component, maintaining the component, etc. The simulation cost evaluator 430 may determine a weight for each component and determine a weighted sum of the individual costs. Different components can have different weights given differences in the operating times of the components during the simulation 402 (a component that operates through the whole simulation 402 may have a higher weight than a component that operates in a part of the simulation 402) or other factors.

The learning adjustment module 440 receives the learning score from the learning cost evaluator 410 and receives the performance score from the performance evaluator 410. The learning adjustment module 440 adjusts the control model 401 based on the learning score and performance score. The performance of the AV would be better with a more accurate control model 401, but the learning cost for such a control model 401 would be higher. The learning adjustment module 440 adjusts the control model 401 to optimize the learning cost and the performance of the AV. In some embodiments, the learning adjustment module 440 adjusts one or more parameters of the control model 401, e.g., internal parameter, hyperparameter, or both. The learning adjustment module 440 may use reinforcement learning to determine an optimal parameter for the control model 401. For instance, the learning adjustment module 440 uses a reward model that rewards better performance and punishes higher learning cost. The reward model may assign a positive reward value to the performance score and a negative reward value to the learning score and seek a maximum overall reward to achieve an optimal solution. The reward model may be a machine learning model, such as a DNN. In some embodiments, the reward model receives the learning score and performance score as input and outputs one or more optimal parameters for the control model 401. In other embodiments, the reward model receives a set of parameters of the control model 401 as input and outputs a modified set of parameters. In such embodiments, the learning score or performance score may be determined by the reward model, e.g., by some layers in the reward model.

The simulation adjustment module 450 can adjust the simulation 402 based on the simulation score and performance score. The simulation adjustment module 450 may generates an optimal set of components of the simulated AV based on an optimization of the simulation cost and the performance of the AV. The performance of the AV would be better with components having better settings (e.g., sensors having higher fidelities), but the cost for running a simulation with such an AV would be higher. The simulation adjustment module 450 adjusts the component settings to optimize the simulation cost and the performance of the AV. The simulation adjustment module 450 may use reinforcement learning to determine an optimal set of component settings. For instance, the simulation adjustment module 450 uses a reward model that rewards better performance and punishes higher simulation cost. The reward model may assign a positive reward value to the performance score and a negative reward value to the simulation score and seek a maximum overall reward to achieve an optimal solution. The reward model may be a trained model, such as a DNN. In some embodiments, the reward model receives the simulation score and performance score as input and outputs one or more optimal settings for one or more components of the AV. In other embodiments, the reward model receives a set of component settings as input and outputs a modified set of component settings. In such embodiments, the simulation score or performance score may be determined by the reward model, e.g., by some layers in the reward model. The modified set of component settings may include mixed settings of different components. For instance, the modified set may include a high fidelity for a sensor and a medium or low fidelity for another sensor.

In some embodiments, the simulation adjustment module 450 may verify the optimal set of component settings that is determined by the reward model. For instance, the simulation adjustment module 450 may provide the optimal set of component settings to the simulation module 340 and instruct the simulation module 340 to modify the simulation 402 or run a new simulation with the optimal set of component settings. The simulation adjustment module 450 may use data from the simulation module 340 to verify the performance of one or more components or of the AV. In an example where the optimal set of component settings includes a modified fidelity of a sensor, the simulation adjustment module 450 may verify whether the sensor achieves the accuracy indicated by the modified fidelity, whether the sensor with the modified fidelity is compatible with other components of the AV, whether the AV has an appropriate operational behavior, and so on.

Example Onboard Computer

Figure 5:
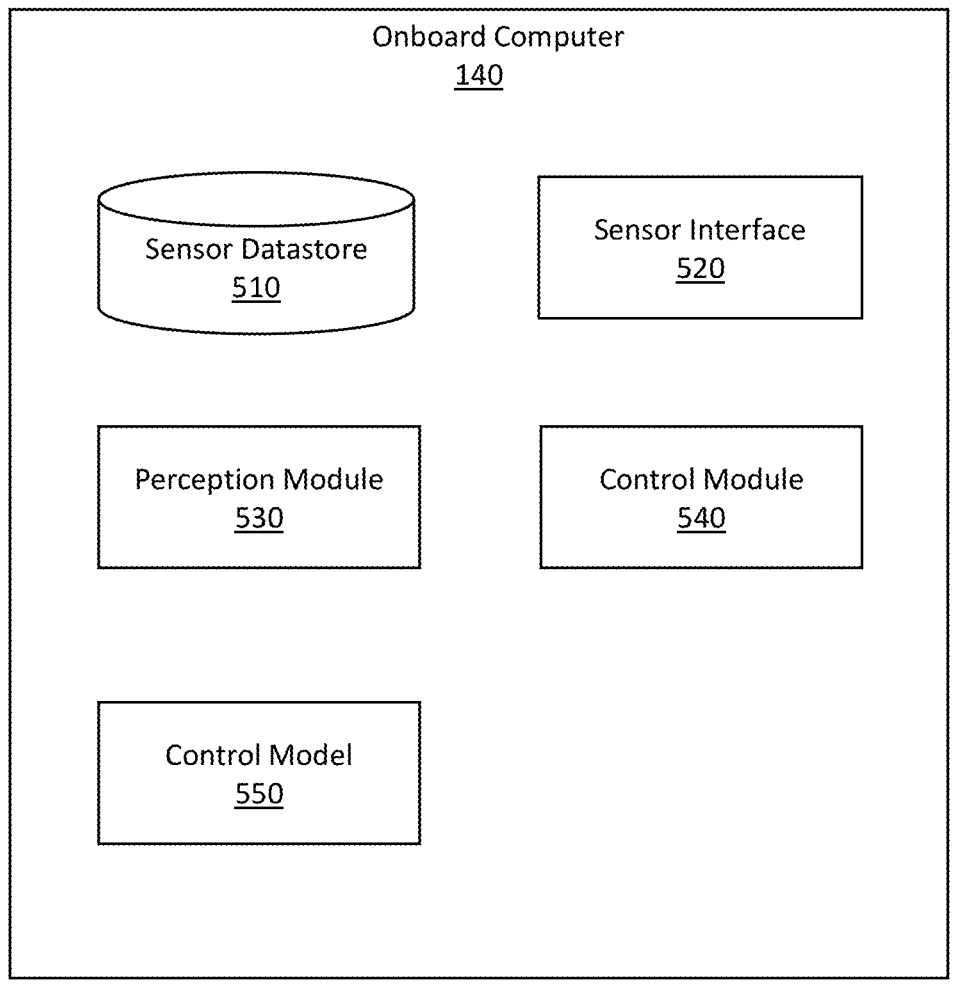
FIG. 5 is a block diagram showing an onboard computer, according to some embodiments of the present disclosure.

FIG. 5 is a block diagram showing the onboard computer 140, according to some embodiments of the present disclosure. The onboard computer 140 includes a sensor datastore 510, a sensor interface 520, a perception module 530, a control module 540, and a control model 550. In alternative configurations, fewer, different and/or additional components may be included in the onboard computer 140. For example, components and modules for conducting route planning, controlling movements of the AV 110, and other vehicle functions are not shown in FIG. 5. Further, functionality attributed to one component of the onboard computer 140 may be accomplished by a different component included in the onboard computer 140 or a different system from those illustrated, such as the fleet management system 120.

The sensor datastore 510 stores sensor data from the sensor suite 130, including sensor data collected by the sensor suite 130 in one or more environments around the AV 110. The sensor datastore 510 may store a detailed map of environments through which the AV 110 may travel. The sensor datastore 510 may store environmental objects captured by exterior sensors (e.g., the exterior sensor 210) of the AV 110. Some of the sensor datastore 510 may be gathered by the AV 110. For example, images obtained by exterior sensors (e.g., the exterior sensor 210) of the AV 110 may be used to learn information about the AV' environments. In some embodiments, the sensor datastore 510 may also store sensor data captured by other AVs. The sensor datastore 510 may store data in the learning datastore 310.

The sensor interface 520 interfaces with the sensors in the sensor suite 130. The sensor interface 520 is configured to receive data captured by sensors of the sensor suite 130, including data from exterior sensors mounted to the outside of the AV 110. The sensor interface 520 may have subcomponents for interfacing with individual sensors or groups of sensors of the sensor suite 130, such as a camera interface, a LIDAR interface, a RADAR interface, a microphone interface, etc. The sensor interface 520 may also request data from the sensor suite 130, e.g., by requesting that a sensor capture data in a particular direction or at a particular time.

The perception module 530 identifies objects captured by the sensor suite 130 of the AV 110. For example, the perception module 530 identifies objects in an environment around the AV 110 based on sensor data from one or more exterior sensors (e.g., the exterior sensor 210). In some embodiments, the perception module 530 may include one or more classifiers trained using machine learning to identify objects. In an embodiment, a multi-class classifier may be used to classify each object as one of a set of potential objects. In another embodiment, a class-specific classifier may be used to classify objects in a particular class. For instance, a pedestrian classifier recognizes pedestrians in the environment of the AV 110, a vehicle classifier recognizes vehicles in the environment of the AV 110, etc. The perception module 530 may also identify characteristics of objects based on sensor data. Example characteristics of an object include shape, size, color, material, weight, speed, orientation, and so on.

In some embodiments, the perception module 530 may use data from other sensors (e.g., the LIDAR sensor 220 or the RADAR sensor 230) to identify characteristics or status of an object. For instance, the perception module 530 may identify travel speeds of identified objects based on data from the RADAR sensor 230, e.g., speeds at which other vehicles, pedestrians, or birds are traveling. As another example, the perception module 53- may identify distances to identified object based on data (e.g., a captured point cloud) from the LIDAR sensor 220, e.g., a distance to a particular vehicle, building, or other feature identified by the perception module 530. The perception module 530 fuses data from multiple sources, such as sensors, datastores, other AVs, other systems, etc. In an example, the perception module 530 fuses data from an interior sensor with data from an exterior sensor and/or data from the learning datastore 310 to identify environmental features. While a single perception module 530 is shown in FIG. 5, in some embodiments, the onboard computer 140 may have multiple perception modules, e.g., different perception modules for performing different ones of the perception tasks described above (e.g., object perception, speed perception, distance perception, feature perception, facial recognition, mood determination, sound analysis, gaze determination, etc.).

The control module 540 controls operation of the AV 110 by using the control model 550. The control model 550 is an AV control model trained with privacy-protected data. In some embodiments, the privacy-protected data is a data set generated by the AV 110 or one or more other AVs 110. The data set may include sensor data from the sensor suite 130, objects identified by the perception module 530, or both. In other embodiments, the privacy-protected data is generated by adjusting the data set, e.g., by changing privacy information included in the data set. In some embodiments, the control model is provided by the fleet management system 120.

The control module 540 may provide input data to the control model 550, and the control model 550 outputs operation parameters of the AV 110. The input data includes sensor data from the sensor suite 130 (which may indicate a current state of the AV 110), objects identified by the perception module 530, or both. The operation parameters are parameters indicating operation to be performed by the AV 110. The operation of the AV 110 may include perception, prediction, planning, localization, navigation, other types of operation, or some combination thereof. The control module 540 may provide instructions to various components of the AV 110 based on the output of the control model 550, and these components of the AV 110 will operation in accordance with the instructions. In an example where the output of the control model 500 indicates that a change of traveling speed of the AV 110 is required given a prediction of traffic condition, the control module 540 may instruct the motor of the AV 110 to change the traveling speed of the AV 110. In another example where the output of the control model 500 indicates a need to detect characteristics of an object in the environment around the AV 110 (e.g., detect a speed limit), the control module 540 may instruct the sensor suite 130 to capture an image of the speed limit sign with sufficient resolution to read the speed limit and instruct the perception module 530 to identify the speed limit in the image.

Example Scene

Figure 6:
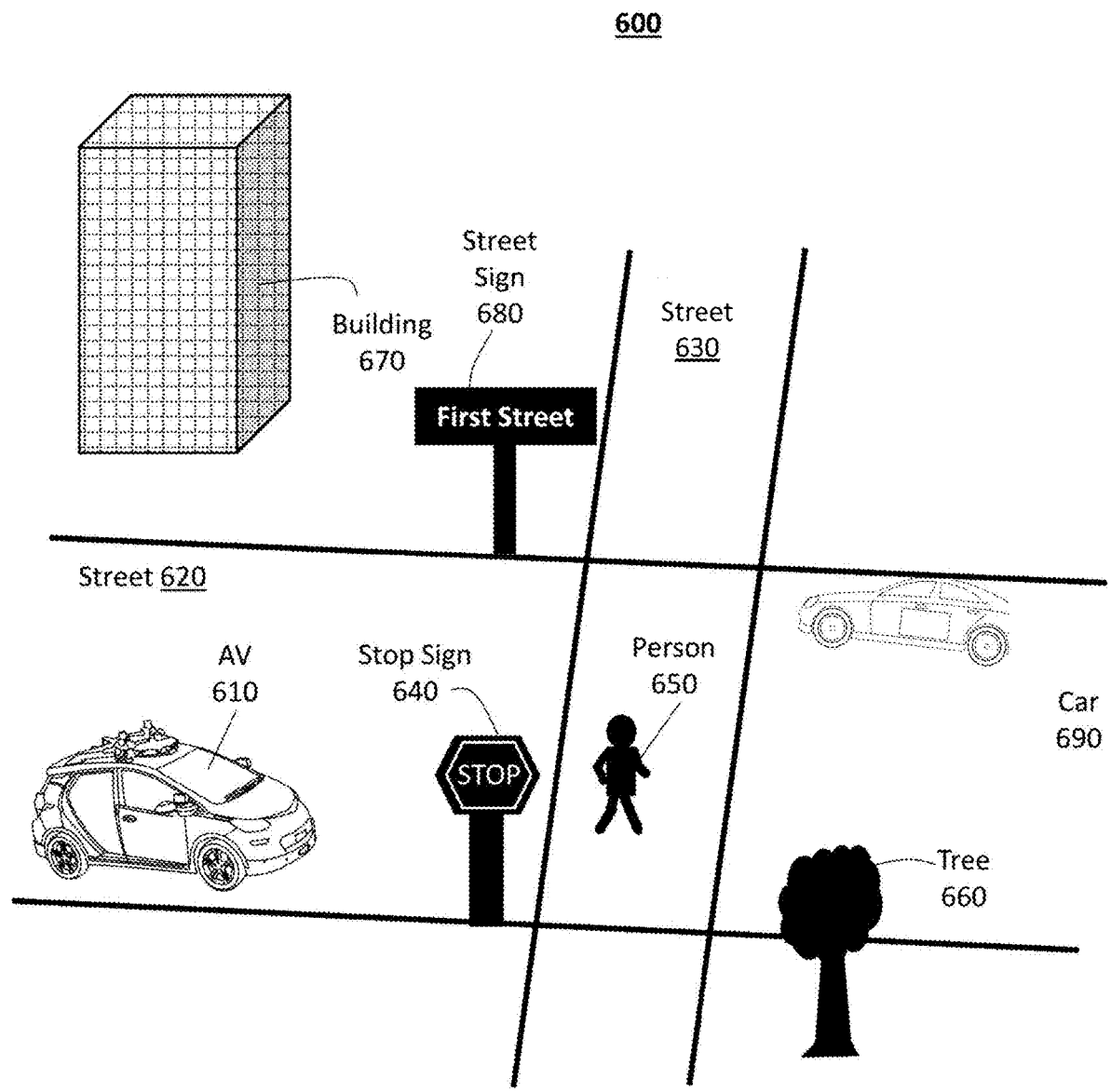
FIG. 6 illustrates an example simulation of an AV operating in a scene, according to some embodiments of the present disclosure.

FIG. 6 illustrates an example simulation of an AV 610 operating in a scene 600, according to some embodiments of the present disclosure. The simulation may be generated and controlled by the simulation module 340. For instance, the simulation module 340 may generate the scene 600, the AV 610, and controls the operation of the AV 610 in the scene 600, e.g., by using a control model. The scene 600 is a simulated scene that may represent a real-world environment, such as a city, etc. The AV 610 is a simulated AV that may represent an AV 110.

In the simulation, the AV 610 travels in the scene 600, e.g., along a street 620. In addition to the street 620, the scene 600 also includes another street 630, a stop sign 640, a person 650, a tree 660, a building 670, a street sign 680, and a car 690. An object in the scene 600 may be a representation (e.g., 2D or 3D image) of a real-world object. The object may also include one or more features (e.g., components, color, shape, size, pattern, etc.) that are not present in the real-world object. Alternatively, an object in the scene 600 may represent a class of objects that are absent in the real-world scene.

The operation of the AV 610 in the scene 600 is controlled by a control model. The control model may be generated by the learning module 320. During the presence of the AV 610 in the scene 600, the sensor suite of the AV 610 detects the scene, including objects present in the scene 600, and generates the sensor data. The sensor suite may simulate the sensor suite 130. The sensor data can be input into the control model and the control model outputs control signals that control operational behaviors of the AV 610. In some embodiments, the control model may use the sensor data to perceive the objects in the scene 600. The control model may make predictions based on the perception of the objects, such as a prediction of a pose or movement of the person 650 or the car 690. The control model may also localize the AV 610 based on the identification of the objects, e.g., determine that the AV 610 is at a stop sign based on the identification of the stop sign 640.

The control model can also make planning based on the perception, prediction, localization, or other information. For example, the control model may plan to stop driving based on the determination that the AV 610 is at the stop sign, plan not to resume driving based on a prediction of the person 650 crossing the street 620, or plan to resuming driving based on a determination that the person 650 has crossed the street, e.g., based on an identification of a position of the person 650. The control model may generate control signals based on the planning and send the control signals to corresponding components of the AV 610. For instance, the control model generates signals to stop or start an actuator of the AV 610 and sends the signals to the actuator. The actuator can stop or resume driving in accordance with the control signals.

In some embodiments, the simulation module 340 can generate or modify the simulation based on information provided by the adjustment module 440. For example, the simulation module 340 may modify fidelities of sensors in the sensor suite based on an optimal set of component settings provided by the adjustment module 440. As another example, the simulation module 340 may receive a modified control model from the learning module 320 that modifies the control model based on parameters provided by the adjustment module 440.

Example Method of Optimization of Deep Learning

Figure 7:
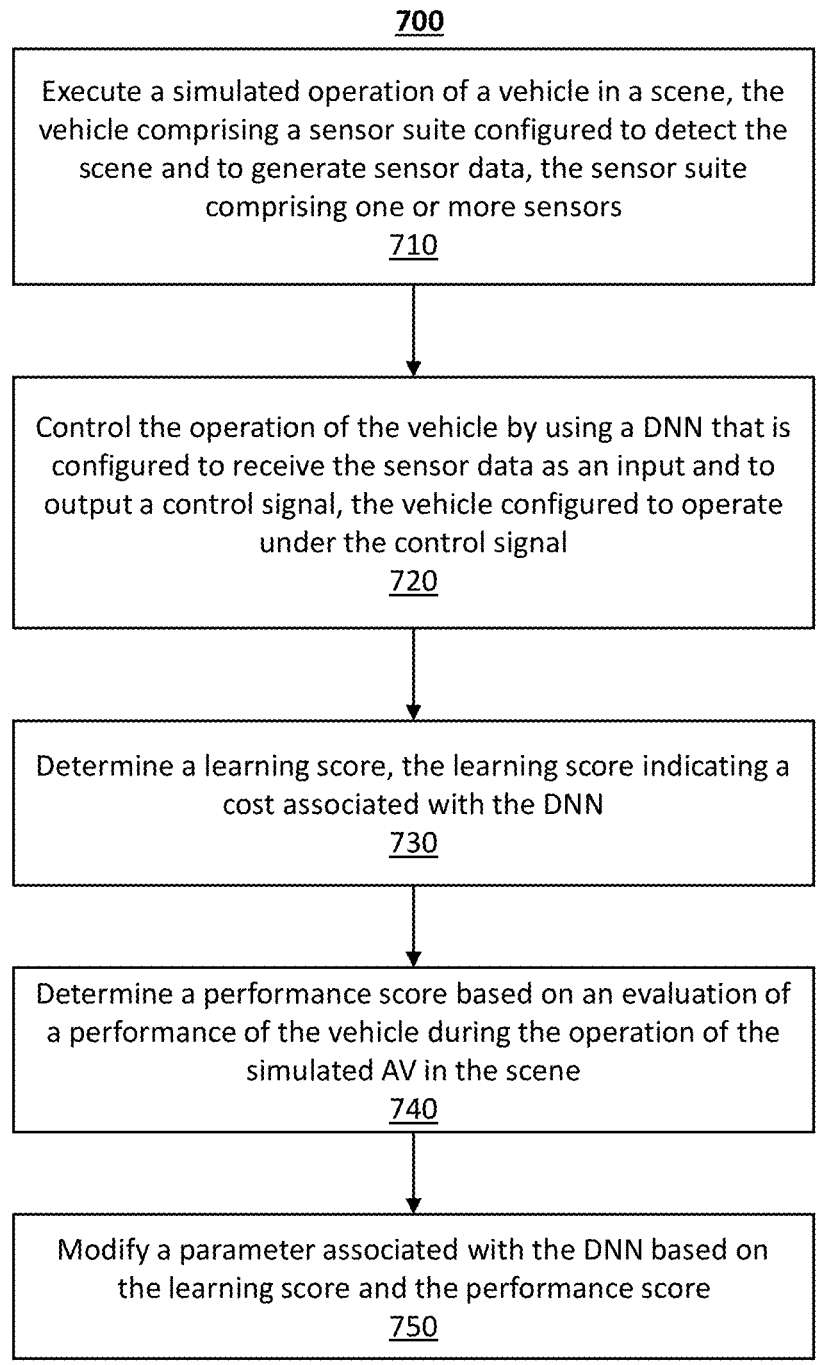
FIG. 7 is a flowchart showing a method for optimization of deep learning, according to some embodiments of the present disclosure.

FIG. 7 is a flowchart showing a method 700 for optimization of deep learning, according to some embodiments of the present disclosure. The method 700 may be performed by the fleet management system 120. Although the method 700 is described with reference to the flowchart illustrated in FIG. 7, many other methods for optimization of deep learning may alternatively be used. For example, the order of execution of the steps in FIG. 7 may be changed. As another example, some of the steps may be changed, eliminated, or combined.

The fleet management system 120 executes, in 710, a simulated operation of a vehicle in a scene. The scene may be a real-world environment. The vehicle may be an AV 110. The vehicle comprises a sensor suite including one or more sensors. The sensor suite is configured to detect the scene and to generate sensor data. In some embodiments, the fleet management system 120 generates a virtual vehicle simulating the vehicle and a virtual scene simulating the scene.

The fleet management system 120 controls, in 720, the operation of the vehicle by using a DNN. The DNN is configured to receive the sensor data as an input and to output a control signal. The vehicle configured to operate under the control signal. In some embodiments, the DNN is trained through E2E training. The DNN may include a plurality of hidden layers that process different tasks. For instance, the DNN may include a layer for perceiving the scene, a layer for predicting a condition in the scene, a layer for localizing the vehicle, a layer for planning a behavior of the vehicle, a layer for generating the control signal and sending the control signal to a component of the vehicle that performs the behavior, and so on.

The fleet management system 120 determines, in 730, a learning score. The learning score indicates a cost associated with the DNN, such as a cost for training the DNN or a cost for using the DNN to control the operation of the vehicle. In some embodiments, the learning score is determined based on an amount of computation resource required for training the DNN or using the DNN to control the operation of the vehicle. The learning score may be determined based on other types of resources, e.g., energy resource, temporal resource, etc.

The fleet management system 120 determines, in 740, a performance score based on an evaluation of a performance of the vehicle during the operation of the simulated AV in the scene. In some embodiments, the fleet management system 120 evaluates operational behaviors of the vehicle in the operation. The operational behaviors may include perception, prediction, localization, planning, navigation, and so on. In other embodiments, the performance score is an aggregation (e.g., a sum, a weighted sum, etc.) of a comfort score indicating a comfort level of a passenger of the vehicle and a safety score indicating a level of operational safety of the vehicle.

The fleet management system 120 modifies, in 750, a parameter associated with the DNN based on the learning score and the performance score. The parameter may be an internal parameter of the DNN. The internal parameter may be determined through training the DNN, and the DNN may determine the control signal by using the internal parameter. The parameter may also be a hyperparameter parameter of the DNN. The hyperparameter may determine how the DNN is trained. The hyperparameter may not be a part of the model itself. Examples of the hyperparameter include quantization bit-width, channel width, filter size, number of epochs, batch size, pooling size, number of hidden layers, choice of cost function, choice of activation function, learning rate, and so on.

The fleet management system 120 may modify the parameter by optimizing an overall score, which is an aggregation of the learning score and the performance score. The learning score may have a negative value, and the performance score may have a positive value. In some embodiments, the fleet management system 120 inputs the learning score and the performance score into a reinforcement learning model, and the reinforcement learning model outputs a modification to the parameter or the modified parameter.

Example Method of Optimization of Simulation

Figure 8:
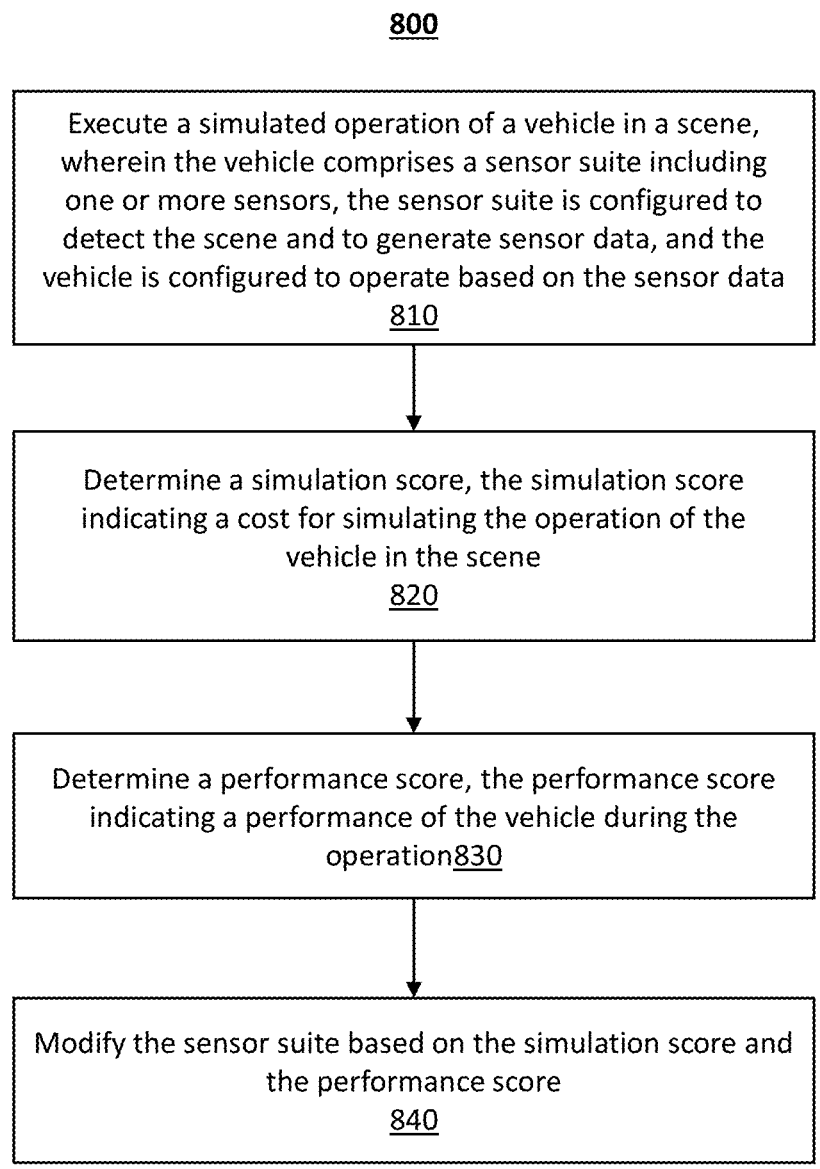
FIG. 8 is a flowchart showing a method for optimization of simulation, according to some embodiments of the present disclosure.

FIG. 8 is a flowchart showing a method 800 for optimization of simulation, according to some embodiments of the present disclosure. The method 800 may be performed by the fleet management system 120. Although the method 800 is described with reference to the flowchart illustrated in FIG. 8, many other methods for optimization of simulation may alternatively be used. For example, the order of execution of the steps in FIG. 8 may be changed. As another example, some of the steps may be changed, eliminated, or combined.

The fleet management system 120 executes, in 810, a simulated operation of a vehicle in a scene. The scene may be a real-world environment. The vehicle may be an AV 110. The vehicle comprises a sensor suite including one or more sensors. The sensor suite is configured to detect the scene and to generate sensor data. The vehicle is configured to operate based on the sensor data. In some embodiments, the fleet management system 120 generates a virtual vehicle simulating the vehicle and a virtual scene simulating the scene.

In some embodiments, the fleet management system 120 controls the operation of the vehicle by using a DNN. The DNN is configured to receive the sensor data as an input and to output a control signal. The vehicle configured to operate under the control signal. In some embodiments, the DNN is trained through E2E training. The DNN may include a plurality of hidden layers that process different tasks. For instance, the DNN may include a layer for perceiving the scene, a layer for predicting a condition in the scene, a layer for localizing the vehicle, a layer for planning a behavior of the vehicle, a layer for generating the control signal and sending the control signal to a component of the vehicle that performs the behavior, and so on.

The fleet management system 120 determines, in 820, a simulation score. The simulation score indicates a cost for simulating the operation of the vehicle in the scene. The simulation score may be determined based on an amount of computational resource consumed by the simulation. The simulation score may also be determined based on other types of resources consumed by the simulation, such as energy resource, temporal resource, and so on.

The fleet management system 120 determines, in 830, a performance score. The performance score indicates a performance of the vehicle during the operation of the simulated AV in the scene. In some embodiments, the fleet management system 120 evaluates operational behaviors of the vehicle in the operation. The operational behaviors may include perception, prediction, localization, planning, navigation, and so on. In other embodiments, the performance score is an aggregation (e.g., a sum, a weighted sum, etc.) of a comfort score indicating a comfort level of a passenger of the vehicle and a safety score indicating a level of operational safety of the vehicle.

The fleet management system 120 modifies, in 850, the sensor suite based on the simulation score and the performance score. The fleet management system 120 may modify one or more fidelities of the sensor suite. The one or more fidelities can indicate an accuracy of the sensor data. The fleet management system 120 may change a first fidelity of a sensor in the sensor suite to a second fidelity of the sensor. The first fidelity or second fidelity is selected from a group of fidelities. The fleet management system 120 may determine a first fidelity for a first sensor in the sensor suite based on the simulation score and the performance score. The fleet management system 120 may also determine a second fidelity for a second sensor in the sensor suite based on the simulation score and the performance score. The first fidelity may be different from the second fidelity.

The fleet management system 120 may modify the sensor suite by optimizing an overall score, which is an aggregation of the simulation score and the performance score. The simulation score may have a negative value, and the performance score may have a positive value. In some embodiments, the fleet management system 120 inputs the simulation score and the performance score into a reinforcement learning model, and the reinforcement learning model outputs a modification to the sensor suite or the modified settings for the sensor suite.

SELECT EXAMPLES

Example 1 provides a method, including executing a simulated operation of a vehicle in a scene, the vehicle including a sensor suite configured to detect the scene and to generate sensor data, the sensor suite including one or more sensors; controlling the operation of the vehicle by using a DNN that is configured to receive the sensor data as an input and to output a control signal, the vehicle configured to operate in accordance with the control signal; determining a learning score, the learning score indicating a cost associated with the DNN; determining a performance score based on an evaluation of a performance of the vehicle during the operation of the simulated AV in the scene; and modifying a parameter associated with the DNN based on the learning score and the performance score.

Example 2 provides the method of example 1, where the learning score indicates a cost for training the DNN or a cost for using the DNN to control the operation of the vehicle.

Example 3 provides the method of example 2, where determining the learning score includes determining an amount of computation resource required for training the DNN or using the DNN to control the operation of the vehicle.

Example 4 provides the method of example 1, where modifying the parameter includes modifying an internal parameter of the DNN, where the internal parameter is determined through training the DNN, and the DNN determines the control signal by using the internal parameter.

Example 5 provides the method of example 1, where modifying the parameter includes modifying a hyperparameter parameter of the DNN, the hyperparameter configured to determine how the DNN is trained.

Example 6 provides the method of example 5, where the hyperparameter is a quantization bit-width, channel width, filter size, number of epochs, batch size, pooling size, number of hidden layers, choice of cost function, choice of activation function, or learning rate.

Example 7 provides the method of example 1, where modifying the parameter includes inputting the learning score and the performance score into a reinforcement learning model, the reinforcement learning model outputting a modified parameter.

Example 8 provides the method of example 1, where modifying the parameter includes determining an overall score by aggregating the learning score and the performance score; and modifying the parameter to optimizing the overall score.

Example 9 provides the method of example 8, where the learning score has a negative value, and the performance score has a positive value.

Example 10 provides the method of example 1, where simulating the operation of the vehicle in the scene includes generating a virtual vehicle that simulates the vehicle; and operating the virtual vehicle in a virtual scene that simulates the scene.

Example 11 provides one or more non-transitory computer-readable media storing instructions executable to perform operations, the operations including executing a simulated operation of a vehicle in a scene, the vehicle including a sensor suite configured to detect the scene and to generate sensor data, the sensor suite including one or more sensors; controlling the operation of the vehicle by using a DNN that is configured to receive the sensor data as an input and to output a control signal, the vehicle configured to operate in accordance with the control signal; determining a learning score, the learning score indicating a cost associated with the DNN; determining a performance score based on an evaluation of a performance of the vehicle during the operation of the simulated AV in the scene; and modifying a parameter associated with the DNN based on the learning score and the performance score.

Example 12 provides the one or more non-transitory computer-readable media of example 11, where the learning score indicates a cost for training the DNN or a cost for using the DNN to control the operation of the vehicle.

Example 13 provides the one or more non-transitory computer-readable media of example 12, where determining the learning score includes determining an amount of computation resource required for training the DNN or using the DNN to control the operation of the vehicle.

Example 14 provides the one or more non-transitory computer-readable media of example 11, where modifying the parameter includes modifying an internal parameter of the DNN, where the internal parameter is determined through training the DNN, and the DNN Example 15 provides the one or more non-transitory computer-readable media of example 11, where modifying the parameter includes modifying a hyperparameter parameter of the DNN, the hyperparameter configured to determine how the DNN is trained.

Example 16 provides the one or more non-transitory computer-readable media of example 11, where modifying the parameter includes inputting the learning score and the performance score into a reinforcement learning model, the reinforcement learning model outputting a modified parameter.

Example 17 provides a computer system, including a computer processor for executing computer program instructions; and one or more non-transitory computer-readable media storing computer program instructions executable by the computer processor to perform operations including executing a simulated operation of a vehicle in a scene, the vehicle including a sensor suite configured to detect the scene and to generate sensor data, the sensor suite including one or more sensors, controlling the operation of the vehicle by using a DNN that is configured to receive the sensor data as an input and to output a control signal, the vehicle configured to operate in accordance with the control signal, determining a learning score, the learning score indicating a cost associated with the DNN, determining a performance score based on an evaluation of a performance of the vehicle during the operation of the simulated AV in the scene, and modifying a parameter associated with the DNN based on the learning score and the performance score.

Example 18 provides the computer system of example 17, where determining the learning score includes determining an amount of computation resource required for training the DNN or using the DNN to control the operation of the vehicle.

Example 19 provides the computer system of example 17, where modifying the parameter includes modifying an internal parameter of the DNN, where the internal parameter is determined through training the DNN, and the DNN determines the control signal by using the internal parameter.

Example 20 provides the computer system of example 17, where modifying the parameter includes modifying a hyperparameter parameter of the DNN, the hyperparameter configured to determine how the DNN is trained.

Example 21 provides a method, including executing a simulated operation of a vehicle in a scene, where the vehicle includes a sensor suite including one or more sensors, the sensor suite is configured to detect the scene and to generate sensor data, and the vehicle is configured to operate based on the sensor data; determining a simulation score, the simulation score indicating a cost for simulating the operation of the vehicle in the scene; determining a performance score, the performance score indicating a performance of the vehicle during the operation; and modifying the sensor suite based on the simulation score and the performance score.

Example 22 provides the method of example 21, where modifying the sensor suite includes modifying one or more fidelities of the sensor suite, the one or more fidelities indicating an accuracy of the sensor data.

Example 23 provides the method of example 22, where modifying the one or more fidelities includes changing a first fidelity of a sensor in the sensor suite to a second fidelity of the sensor, where the first fidelity or second fidelity is selected from a group of fidelities.

Example 24 provides the method of example 22, where modifying the one or more fidelities includes determining a first fidelity for a first sensor in the sensor suite based on the simulation score and the performance score, determining a second fidelity for a second sensor in the sensor suite based on the simulation score and the performance score, and the first fidelity is different from the second fidelity.

Example 25 provides the method of example 21, where modifying the sensor suite includes inputting the simulation score and the performance score into a reinforcement learning model, the reinforcement learning model outputting one or more fidelities of the sensor suite, the one or more fidelities indicating an accuracy of the sensor data.

Example 26 provides the method of example 21, where modifying the sensor suite includes determining an overall score by aggregating the simulation score and the performance score; and modifying the sensor suite to optimizing the overall score.

Example 27 provides the method of example 26, where the simulation score has a negative value, and the performance score has a positive value.

Example 28 provides the method of example 21, where simulating the operation of the vehicle in the scene includes generating a virtual vehicle that simulates the vehicle, the virtual vehicle including a virtual sensor suite that simulates the sensor suite; and operating the virtual vehicle in a virtual scene that simulates the scene.

Example 29 provides the method of example 21, where determining the simulation score includes determining an amount of computation resource consumed for simulating the operation of the vehicle in the scene.

Example 30 provides the method of example 21, further including controlling the operation of the vehicle by using a DNN that is configured to receive the sensor data as an input and to output a control signal, the vehicle is configured to operate in accordance with the control signal, where the DNN includes a plurality of layers, and the control signal includes an output from a layer of the plurality of layers.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method, comprising:
   executing a simulated operation of a vehicle in a scene, the vehicle comprising a sensor suite configured to detect the scene and to generate sensor data, the sensor suite comprising one or more sensors;
   controlling the operation of the vehicle by using a deep neural network (DNN) that is configured to receive the sensor data as an input and to output a control signal, the vehicle configured to operate in accordance with the control signal;
   determining a learning score, the learning score indicating a cost associated with the DNN;
   determining a performance score based on an evaluation of a performance of the vehicle during the operation of the vehicle in the scene; and
   modifying a parameter associated with the DNN based on the learning score and the performance score.

2. The method of claim 1, wherein the learning score indicates a cost for training the DNN or a cost for using the DNN to control the operation of the vehicle.

3. The method of claim 2, wherein determining the learning score comprises:
   determining an amount of computation resource required for training the DNN or using the DNN to control the operation of the vehicle.

4. The method of claim 1, wherein modifying the parameter comprises:
   modifying an internal parameter of the DNN,
   wherein the internal parameter is determined through training the DNN, and the DNN determines the control signal by using the internal parameter.

5. The method of claim 1, wherein modifying the parameter comprises:
   modifying a hyperparameter parameter of the DNN, the hyperparameter configured to determine how the DNN is trained.

6. The method of claim 5, wherein the hyperparameter is a quantization bit-width, channel width, filter size, number of epochs, batch size, pooling size, number of hidden layers, choice of cost function, choice of activation function, or learning rate.

7. The method of claim 1, wherein modifying the parameter comprises:
   inputting the learning score and the performance score into a reinforcement learning model, the reinforcement learning model outputting a modified parameter.

8. The method of claim 1, wherein modifying the parameter comprises:
   determining an overall score by aggregating the learning score and the performance score; and
   modifying the parameter to optimizing the overall score.

9. The method of claim 8, wherein the learning score has a negative value, and the performance score has a positive value.

10. The method of claim 1, wherein simulating the operation of the vehicle in the scene comprises:
    generating a virtual vehicle that simulates the vehicle; and operating the virtual vehicle in a virtual scene that simulates the scene.

11. One or more non-transitory computer-readable media storing instructions executable by a processor to perform operations, the operations comprising:
   executing a simulated operation of a vehicle in a scene, the vehicle comprising a sensor suite configured to detect the scene and to generate sensor data, the sensor suite comprising one or more sensors;
   controlling the operation of the vehicle by using a deep neural network (DNN) that is configured to receive the sensor data as an input and to output a control signal, the vehicle configured to operate in accordance with the control signal;
   determining a learning score, the learning score indicating a cost associated with the DNN;
   determining a performance score based on an evaluation of a performance of the vehicle during the operation of the vehicle in the scene; and
   modifying a parameter associated with the DNN based on the learning score and the performance score.

12. The one or more non-transitory computer-readable media of claim 11, wherein the learning score indicates a cost for training the DNN or a cost for using the DNN to control the operation of the vehicle.

13. The one or more non-transitory computer-readable media of claim 12, wherein determining the learning score comprises:
   determining an amount of computation resource required for training the DNN or using the DNN to control the operation of the vehicle.

14. The one or more non-transitory computer-readable media of claim 11, wherein modifying the parameter comprises:
   modifying an internal parameter of the DNN,
   wherein the internal parameter is determined through training the DNN, and the DNN determines the control signal by using the internal parameter.

15. The one or more non-transitory computer-readable media of claim 11, wherein modifying the parameter comprises:
   modifying a hyperparameter parameter of the DNN, the hyperparameter configured to determine how the DNN is trained.

16. The one or more non-transitory computer-readable media of claim 11, wherein modifying the parameter comprises:
   inputting the learning score and the performance score into a reinforcement learning model, the reinforcement learning model outputting a modified parameter.

17. A computer system, comprising:
   a computer processor for executing computer program instructions; and
   one or more non-transitory computer-readable media storing computer program instructions executable by the computer processor to perform operations comprising:
      executing a simulated operation of a vehicle in a scene, the vehicle comprising a sensor suite configured to detect the scene and to generate sensor data, the sensor suite comprising one or more sensors,
      controlling the operation of the vehicle by using a deep neural network (DNN) that is configured to receive the sensor data as an input and to output a control signal, the vehicle configured to operate in accordance with the control signal,
      determining a learning score, the learning score indicating a cost associated with the DNN,
      determining a performance score based on an evaluation of a performance of the vehicle during the operation of the vehicle in the scene, and
      modifying a parameter associated with the DNN based on the learning score and the performance score.

18. The computer system of claim 17, wherein determining the learning score comprises:
   determining an amount of computation resource required for training the DNN or using the DNN to control the operation of the vehicle.

19. The computer system of claim 17, wherein modifying the parameter comprises:
   modifying an internal parameter of the DNN,
   wherein the internal parameter is determined through training the DNN, and the DNN determines the control signal by using the internal parameter.

20. The computer system of claim 17, wherein modifying the parameter comprises:
   modifying a hyperparameter parameter of the DNN, the hyperparameter configured to determine how the DNN is trained.

* * * * *